US007882577B2

United States Patent
Merz et al.

(10) Patent No.: US 7,882,577 B2
(45) Date of Patent: Feb. 8, 2011

(54) MOBILE SANITARY SYSTEM FOR A PLURALITY OF PEOPLE

(75) Inventors: Erwin Merz, Waiblingen (DE); Michael Moser, Oberrot-Hausen (DE); Gunter Siegle, Remshalden-Geradstetten (DE); Johann Tatar, Stuttgart (DE)

(73) Assignee: Kärcher Futuretech GmbH, Winnenden (DE)

( * ) Notice: Subject to any disclaimer, the term of this patent is extended or adjusted under 35 U.S.C. 154(b) by 0 days.

(21) Appl. No.: 11/635,923

(22) Filed: Dec. 8, 2006

(65) Prior Publication Data

US 2007/0130686 A1 Jun. 14, 2007

Related U.S. Application Data

(63) Continuation of application No. PCT/EP2005/005539, filed on May 21, 2005.

(30) Foreign Application Priority Data

Jun. 9, 2004 (DE) ........................ 10 2004 029 033

(51) Int. Cl.
   *A47K 4/00* (2006.01)
(52) U.S. Cl. .............................. 4/663; 4/664
(58) Field of Classification Search ...................... 4/321, 4/342, 663, 664
   See application file for complete search history.

(56) References Cited

U.S. PATENT DOCUMENTS

| 2,419,319 A | * | 4/1947 | Lankton | ...................... 4/663 X |
| 2,817,091 A | | 12/1957 | Painter | |
| 3,668,710 A | | 6/1972 | Dowd | |
| 4,107,795 A | | 8/1978 | Carter et al. | |
| 4,454,613 A | * | 6/1984 | Palmer | ....................... 4/625 X |
| 5,548,856 A | | 8/1996 | Julian | |
| 6,102,704 A | | 8/2000 | Eibofner et al. | |
| 2003/0115808 A1 | | 6/2003 | Morrow | |

FOREIGN PATENT DOCUMENTS

| DE | 42 09 048 | 9/1993 |
| JP | 10071900 | 3/1998 |
| WO | 87/07665 | 12/1987 |

OTHER PUBLICATIONS

Pages taken from the website www.sert.fr/en/sanitaire/remorque-douche-rd3000.php, 2 pgs.*
English language translation of AT 272,974 B. 5 pgs.*
Prospect, elettromeccanica Carra s.r.l., "Toilet Shelter.", no date, 4 pgs.
Prospect, "Sanitation Range.", no date, 4 pgs.
Latrines RS 2400, www.sert.fr/cadreB.htm, (Printed May 20, 2004)., 1 pg.
Prospect, Alfred Kärcher GmbH & Co, "Sanitary Container SC 30.", no date, 1 pg.
English language abstract of DE 3924179, 1 pg.
English language abstract of JP 2002-178873, 1 pg.
"RD 3000" printed webpage obtained on Aug. 31, 2009, from a Jun. 1, 2001, entry in an internet archive (www.web.archive.org) (one page).
Life Support Field Utilities printed webpage obtained on or about Aug. 17, 2009. (Available from www.Sert.FR/EN/Sanitaire/Remorque-douch.RD3000.php, last visited Sep. 1, 2009 (two pages).

* cited by examiner

*Primary Examiner*—Robert M Fetsuga
(74) *Attorney, Agent, or Firm*—Klarquist Sparkman, LLP

(57) ABSTRACT

A mobile sanitary system has a transportable platform, in particular a chassis, on which a plurality of sanitary elements are arranged. A number of technical supply devices are situated on the platform. According to one aspect of the invention, the technical supply devices are arranged in a central region of the platform, which region is surrounded all the way around by the plurality of sanitary elements.

22 Claims, 6 Drawing Sheets

MOBILE SANITARY SYSTEM FOR A PLURALITY OF PEOPLE

CROSS REFERENCES TO RELATED APPLICATION

This application is a continuation of International Patent Application No. PCT/EP2005/005539, filed on May 21, 2005, and designating the U.S., which international patent application has been published in German as WO 2005/120901 A1 and which international patent application claims priority from German Patent Application No. 10 2004 033.4, filed on Jun. 9, 2004. The entire contents of these prior applications are incorporated herein by reference.

BACKGROUND

This application relates to a mobile sanitary system for location-independent sanitary care of a plurality of people. More particularly, this application relates to a mobile sanitary system comprising a transportable platform, on which a plurality of sanitary elements and a number of technical supply devices for the sanitary elements are arranged.

Mobile sanitary systems are required in particular if a large number of people have to survive away from civilization for a relatively long period of time. Typical use situations include military exercises or deployments of relatively large troop units, but also humanitarian uses, for example within the context of disaster aid in an earthquake region. Furthermore, mobile sanitary systems are frequently also used at public festivals and other large events if the capacities of existing stationary sanitary systems are insufficient. Although this application relates in its preferred embodiment primarily to the first-mentioned use situations, it is not limited thereto.

A mobile sanitary system has a plurality of sanitary elements which are available to the users for personal hygiene and/or for answering the call of nature. In particular, these involve showers, washbasins, toilets, urinals, etc. Furthermore, a mobile sanitary system requires technical supply devices for the sanitary elements, such as, for example, fresh water tanks and/or sewage tanks, heating for hot water preparation, pumps and more besides. These technical supply devices do not generally have to be accessible to the user of the mobile sanitary system.

U.S. Pat. No. 5,548,856 discloses a mobile sanitary system with a total of four chemical toilets and two hand basins. The sanitary elements mentioned and the associated supply technology, such as, in particular, sewage tanks, are arranged on a two-axle trailer, i.e., on a movable platform. Two chemical toilets are respectively situated next to each other at the front and at the rear end of the trailer. Two sewage tanks and further supply devices which are in each case freely accessible from the longitudinal sides of the trailer are arranged between the four chemical toilets. With this design, the known sanitary system provides a narrowly restricted range of use, namely as a mobile toilet station. Full sanitary care for a plurality of people is not possible.

A further mobile sanitary system is known from U.S. Pat. No. 2,817,091. This sanitary system is likewise installed on a trailer as a transportable platform, and it provides a plurality of people with various sanitary possibilities of care, but no showers. In terms of concept, the known sanitary system is more suitable as a public toilet system for large events, etc. It is fairly large, which makes its transportation over difficult terrain difficult and, under some circumstances, makes transfer by air freight impossible.

Similar mobile toilet systems are known from DE 27 17 705 A1 and WO 87/07665. These systems are also configured, in terms of conception, more for large events and are less suitable for military deployments or for disaster aid in inaccessible terrain.

A further mobile sanitary system is known from DE 93 07 507 U1, this involving a mobile toilet vehicle which is provided, in particular, for disabled people. Full sanitary care for a plurality of people is therefore not possible.

For military uses, there is a series of providers of mobile sanitary systems. A system which is accommodated in a standard container relocatable by truck and air is provided, for example, by the Italian firm elettromeccanica Cara S.r.l. Further prior art sanitary systems are provided by the French firm SERT under the designation RD 3000, RD 2400 or RS 2400. The present applicant likewise provides a mobile sanitary system for uses of this type under the designation SC 30.

In all mobile sanitary systems, there are contradictory requirements, namely, on the one hand, the desire for them to be able to be transported as easily as possible and, in association therewith, boundary conditions with regard to external dimensions and weight, and, on the other hand, the greatest possible convenience and range of use for the users. None of the previously known sanitary systems has met these contradictory requirements in an optimum manner. There is therefore a need for improvement.

SUMMARY

Against this background, described below are embodiments of a mobile sanitary system of the type mentioned at the beginning which permits diverse sanitary care for a large number of people and which can be easily transported.

In some embodiments, the mobile sanitary system also facilitates efficient heating of fresh water required in the course of operation.

In some embodiments, the mobile sanitary system facilitates easy access to the sanitary elements even in the case where the system is used by a plurality of people.

According to one aspect, there is provided a mobile sanitary system for location-independent sanitary care of a plurality of people, comprising a transportable platform having a central region, and comprising a plurality of sanitary elements and a number of technical supply devices for the sanitary elements, wherein the sanitary elements and the technical supply devices both are arranged on the transportable platform, with the technical supply devices being arranged in the central region, and with the sanitary elements surrounding the technical supply devices all the way around.

In contrast thereto, the technical supply devices in all previously known mobile sanitary systems are accessible from an edge region. In other words, in none of the previously known mobile sanitary systems is the concept realized of surrounding the technical supply devices all the way around with sanitary elements for the users. In this context, all the way around means that the sanitary elements occupy all of the outer sides of the mobile sanitary system which basically permit access for users of the sanitary elements. If the sanitary system is accommodated, for example, on a trailer or on a wheel-less, but self-supporting platform, such as, for example, a container, the sanitary elements are therefore arranged on the four outer sides of the trailer or container. If, by contrast, the sanitary system has the frame of a truck with a driver's cab as the platform, the concept of the present invention would also be realized if the sanitary elements together with the driver's cab (on one side) surround the technical supply devices. For cost reasons, it is, however, generally preferred not to equip the mobile sanitary system with a dedicated transportation option, i.e., not to arrange it fixedly on a truck. Accordingly, it is preferred that the plurality of the sanitary elements surround the technical supply devices from four sides.

The novel concept has a series of advantages. Firstly, the technical supply devices are generally rather heavy components in comparison to the sanitary elements. The novel arrangement enables the main weight of the entire sanitary system to be concentrated in the central region of the platform. If the platform is, for example, a central-axle trailer, the mass center of gravity of the entire system is optimally positioned over the axle. The sanitary system is therefore readily maneuverable during transportation and is also inherently mounted in a stable manner in the operating state. Furthermore, the novel concept provides maximum accessibility to the sanitary elements, which favors the simultaneous care of a plurality of people. On the other hand, a low overall height can be realized, with the result that the users of the sanitary system may only have to climb a few steps. Furthermore, a low overall height improves the transportability, and it makes it possible to optionally dispense with railings or similar measures protecting against people falling off, which saves on weight.

A further great advantage of the novel concept is that the water supplies of the sanitary system can be heated very efficiently, since they are situated, as part of the technical supply devices, in the central region surrounded all the way around by sanitary elements. The spatial region to be heated up is thereby minimized and, furthermore, can be thermally insulated more easily. The supply lines between fresh water tanks and/or sewage tanks and the sanitary elements are also minimal. Furthermore, the simple and efficient heating makes it possible to design fuel tanks to be smaller and lighter without reducing the normal service life of the sanitary system, which likewise favors the transportability.

Overall, the novel concept therefore has a series of advantages which favor flexible and versatile sanitary care of a plurality of people and also the mobility of the system.

In a preferred refinement, each sanitary element has a rear wall, the plurality of rear walls enclosing the technical supply devices in an encircling manner.

This refinement has the advantage that the technical supply devices are withdrawn from access to the users of the sanitary system in a very simple manner and such that they are hidden from view. This achieves effective protection against intentional or unintentional damage. Furthermore, the spatial volume to possibly be heated up is limited, which even more strongly emphasizes the advantages already mentioned previously.

In a further refinement, the technical supply devices comprise a switch cabinet with a console which protrudes upward above the rear wall.

This measure permits simple and convenient control of the novel sanitary system whilst retaining the previously mentioned advantages. To protect against manipulations and/ damage, the control console can be covered by a lockable flap or the like. Furthermore, the measure is particularly advantageous in combination with a refinement mentioned further below, namely a height-adjustable roof. A fixed control console which protrudes just above the height of the rear walls is simple to install and, if appropriate, also permits the operation of the height-adjustable roof.

In a further refinement, at least one of the sanitary elements is arranged movably such that, in a first position, it is adjacent to the central region and, in a second position, it is remote from the central region in order to open up access to the central region.

This is a particularly preferred refinement, since the maintenance and, if appropriate, repair of the novel sanitary system are substantially simplified. Furthermore, this refinement makes it possible to optimally use the available construction space, with the result that the novel sanitary system can be realized in very compact form. In principle, however, maintenance of the technical supply devices from above or below would also be possible.

In a very simple implementation of the afore-mentioned refinement, the at least one sanitary element can have a prepared disassembly option, with the result that it can be disassembled in a simple manner. The sanitary element can then be removed from the sanitary system in order to open up access to the technical supply devices.

In a preferred refinement, the at least one sanitary element is secured to a frame which permits displacement of the at least one sanitary element, preferably in at least one horizontal direction.

This refinement permits very simple and convenient access to the technical supply devices. Access is very rapidly possible and, furthermore, the restoration of the normal operating state is reliably ensured by pushing back the at least one sanitary element. The displacement of the sanitary element in a horizontal direction is preferred because it can be carried out easily in terms of effort and, furthermore, permits a low overall height of the entire sanitary system.

In a further preferred refinement, the displacement frame is designed such that it permits displacement in at least two, preferably horizontal, directions which are orthogonal to each other.

A two-dimensional displacement mechanism of this type has a series of advantages. Firstly, it allows to displace the at least one sanitary element in the horizontal direction only, but with a large adjustment travel. On the one hand, this permits convenient access to the technical supply devices and, on the other hand, achieves a low overall height and an adjustment movement with little effort. Furthermore, the two-dimensional displacement mechanism, as set out below with reference to a particularly preferred exemplary embodiment, can also be used to improve the operability of the sanitary elements for the user, in particular if the sanitary element concerned is fitted in the region of the wheel houses of a trailer or in the region of other narrow points. In addition, a two-dimensional displacement mechanism makes it possible "to pull out" the sanitary element concerned to a certain extent from the row of sanitary elements, which permits a very compact constructional form in the transportation state.

In a further refinement, the sanitary elements are connected to form a plurality of sanitary modules, with one sanitary module in each case being arranged on one side of the central region. Each sanitary module is preferably of integral design comprising a row of sanitary elements.

This refinement is particularly advantageous in combination with a displacement frame, since, by displacing a sanitary module, particularly great access to the central supply devices is made possible. Furthermore, the use of sanitary modules permits a cost-effective and variable design of the novel sanitary system.

In a further refinement, the novel sanitary system has a height-adjustable roof, with an adjustment drive for the roof preferably being arranged on the roof itself.

This refinement makes it possible to further reduce the overall height of the novel sanitary system for transportation. Transportation is further simplified. On the other hand, the users of the novel sanitary system do not have to accept any limitations with regard to the convenience of use. The arrangement of the adjustment drive on the roof has the advantage that drive shafts, worm gears, cable-pull mechanisms and the like are shifted to a point where no sanitary elements are required. Therefore, in this refinement, the hygiene region for the user can be used optimally.

In a further refinement, on its upper side, the roof has a central depression, the area of which lies below an upper roof level, with preferably at least one chimney, which is connected to the technical supply devices, ending in the depression below the upper roof level.

The abovementioned depression in itself already has the advantage that the roof can be realized in a stable manner in a lightweight construction. This is because the profiling of the depression results in increased stability. Furthermore, the chimney mouth, which is preferably arranged in the depression, has the advantage that the chimney is protected against damage during transportation. As a result, the novel sanitary system is even easier to transport.

In a further refinement, the depression runs into at least one channel branching off laterally from the roof edge.

This refinement is a very simple and efficient measure for draining the central depression. Instead of the abovementioned channel, a central water drain, for example, would also be possible. However, the preferred refinement is more cost-effective to realize and, in addition, has the advantage that the branching-off channel results in a further profiling of the roof which increases the stability.

In a further refinement, the novel sanitary system has a plurality of first pivotable side flaps which, in a first pivoting position, at least partially cover the sanitary elements from the outside in the manner of a wall and which, in a second pivoting position, form an encircling step region around the sanitary elements.

The use of pivotable side flaps may well be known in itself from other sanitary systems. However, in conjunction with the present invention, this refinement permits easy access to all of the sanitary elements. Furthermore, the side flaps readily protect the sanitary elements against damage during transportation without a particular outlay being required for this purpose.

In a further refinement, the novel sanitary system has a plurality of second pivotable side flaps which, in a first pivoting position, at least partially cover the sanitary elements from the outside in the manner of a wall and which, in a second pivoting position, form an encircling roof region over the sanitary elements.

The second side flaps also increase the convenience of use by enlarging the roof region of the sanitary system in the operating state. On the other hand, an even better protection of the sanitary elements against transportation damage is thereby achieved.

In a further refinement of the abovementioned measure, the second pivotable side flaps engage over the first pivotable side flaps from above when the first and second side flaps are each in their first pivoting position.

This measure achieves a very simple and efficient securing of the first pivotable side flaps during transportation.

In a further refinement, the second side flaps each are connected to at least one spring element which, on account of its geometry, fixes the second side flaps both in their first pivoting position and in their second pivoting position.

This refinement permits a particularly simple and reliable securing of the second side flaps during transportation. Owing to the fact that the abovementioned spring element takes on a holding function in both pivoting positions, the mechanical design of the novel sanitary system can be simplified and the weight thereof reduced.

In a further refinement, the sanitary elements comprise at least one shower, at least one toilet and/or at least one washbasin. Preferably, a plurality of each such sanitary elements are contained in the novel sanitary system.

This results in a wide range of application and therefore in versatile use, which is of great advantage with regard to the high degree of transportability and flexible use on account of the novel concept.

In a further refinement, a pivotable mirror, in particular a commercially available truck side mirror, is arranged in the region of the washbasin.

Of course, the use of mirrors in the region of washbasins is not new in sanitary systems. However, the use of a pivotable mirror is highly advantageous, since this permits the mirror to be installed with regard to space constraints and minimum transportation dimensions. In particular, it is preferred to arrange the mirror lower than at the customary user height, since this enables the maximum overall height of the sanitary system to be reduced for the benefit of being able to be transported. The use of a commercially available truck side mirror (exterior mirror) is particularly preferred, since these mirrors are extremely robust and are also very cost-effective.

It goes without saying that the features mentioned above and those which have yet to be explained below can be used not only in the respectively stated combination but also in other combinations or on their own without departing from the scope of the present invention.

BRIEF DESCRIPTION OF THE DRAWINGS

Exemplary embodiments are illustrated in the drawings and are explained in more detail in the description below. In the drawing.

DESCRIPTION OF PREFERRED EMBODIMENTS

Figure 1:
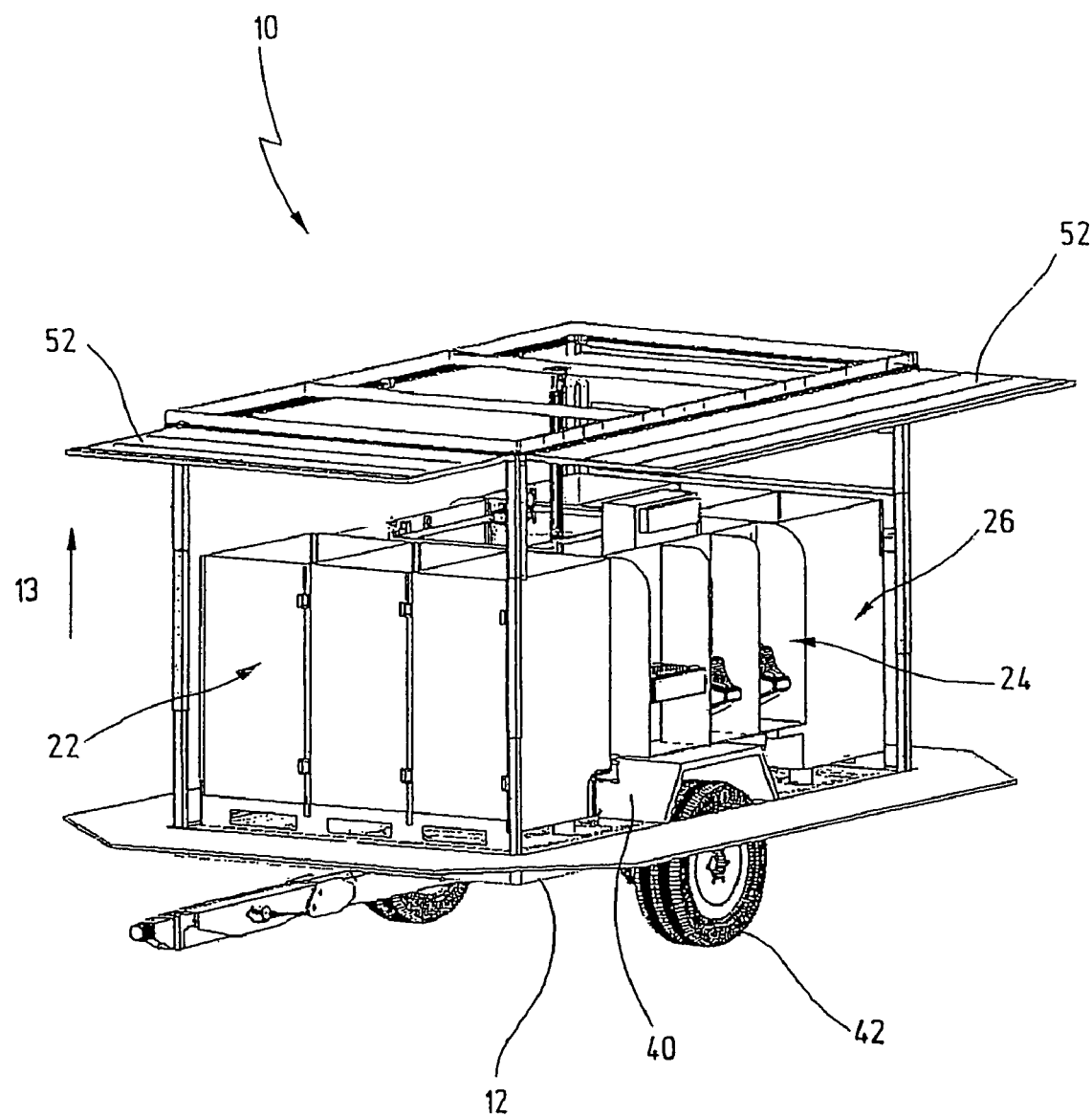
FIG. 1 shows a partially cut-away, isometric view of a preferred exemplary embodiment of the novel sanitary system.

In FIG. 1, an embodiment of the novel sanitary system is referred to in its entirety by reference number 10.

The sanitary system 10 is constructed here on a single-axle motor vehicle trailer 12 which forms a transportable platform. In this embodiment, the trailer 12 has a permissible overall weight of 3.5 tonnes. In the embodiment, the transportation dimensions of the sanitary system 10 are approximately 6 m× 2.3 m in length and width and approximately 2.5 m in height.

However, the sanitary system 10 is not illustrated in FIG. 1 in its transportation state but rather in its operating state, in which the dimensions are approximately 6.6 m× 3.6 m in length and width and approximately 3.2 m in height. The enlarged dimensions arise by pivoting out the side flaps (described below) and by raising the roof construction in the direction of the arrow 13.

Figure 2:
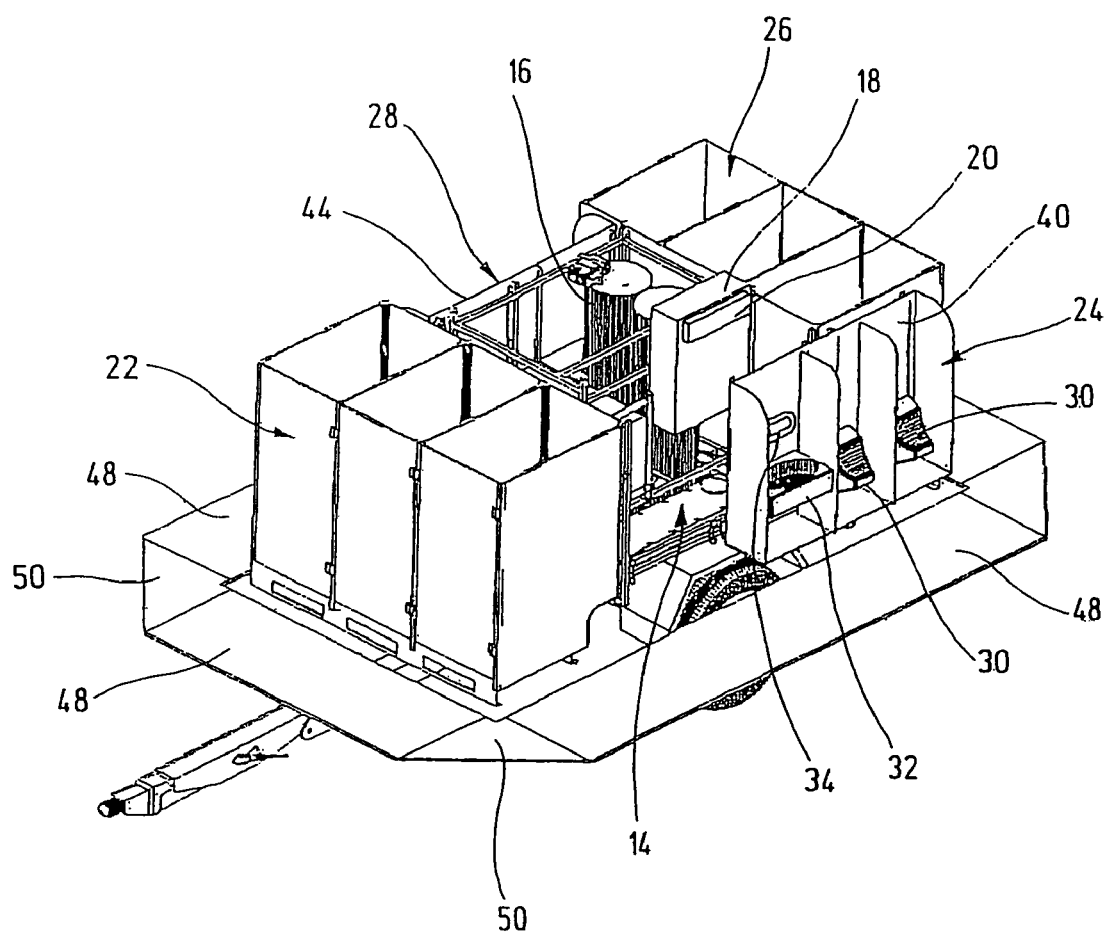
FIG. 2 shows the sanitary system from FIG. 1, with, for clarity reasons, the roof construction not being illustrated and with a sanitary module being displaced in order to open up access to the technical supply devices.
Figure 3:
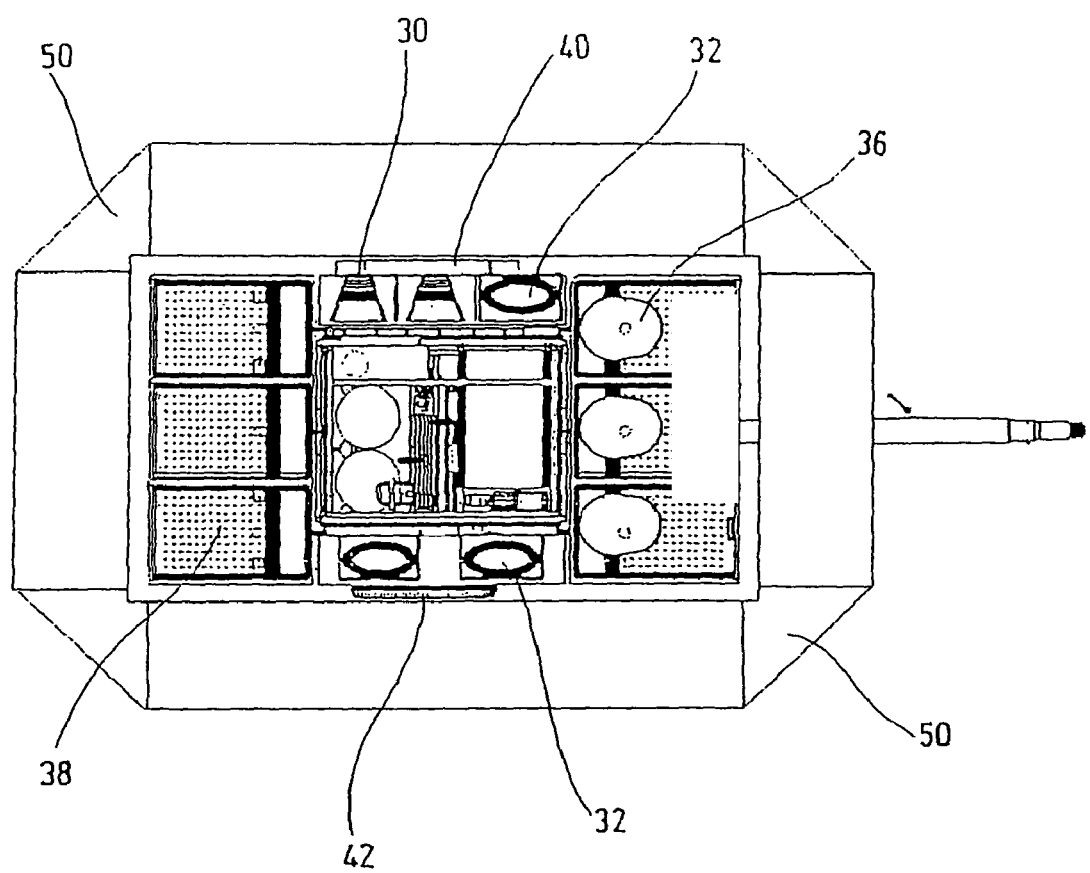
FIG. 3 shows the sanitary system from FIG. 2 in a plan view from above, with all of the sanitary modules being situated in their transportation position.

For the following description of the sanitary system 10, reference is also made to FIGS. 2 and 3, in which the same reference numbers refer to the same elements as in FIG. 1.

On the trailer 12, the sanitary system 10 has a central region 14 in which virtually all of the technical supply devices for the sanitary system 10 are accommodated. A tank 16 and a switch cabinet 18 with a control console 20 are referred to here by way of example. Furthermore, the technical supply devices contain, for example, hot water preparation, one or more pumps, an electric supply, a fuel tank for the heating system and more (not illustrated in detail here).

It goes without saying that small parts such as, for example, a 12 or 24 volt battery or a connection for an external power supply may also be arranged, depending on requirements, outside the central region 14 without departing from the basic concept according to which the essential technical supply devices are assembled in the central region 14 and are surrounded by sanitary elements.

The reference numbers 22, 24, 26 and 28 refer to four sanitary modules which surround the central technical region 14 from four sides. In the preferred embodiment shown here, the sanitary module 24 contains two urinals 30 arranged next to each other, and a washbasin 32. A pivotable mirror 34 is arranged above the washbasin 32. In the preferred embodiment, the pivotable mirror 34 is a commercially available truck side mirror which is fitted horizontally above the washbasin 32. A vertical intermediate wall is arranged in each case between the two urinals 30 and the washbasin 32, so that the sanitary elements 30, 32 are screened visually from one another.

The sanitary module 22 here contains three toilet cubicles which are separated from one another by intermediate walls and are closed to the front by doors and each have a toilet 36 (FIG. 3). The sanitary module 26 contains three shower cubicles each having a shower 38. The fourth sanitary module 28 contains two washbasins 32 arranged next to each other (FIG. 3).

In the preferred embodiment, the spatial external dimensions of the sanitary modules 22 and 26 are identical in size. The same applies to the sanitary modules 24 and 28 but they differ in their external dimensions from the sanitary modules 22, 26. The sanitary modules 22, 26 are larger in their external dimensions. They are arranged at the front and rear end, respectively, of the trailer 12 and are in each case accessible from the corresponding end side. By contrast, the sanitary modules 24, 28 are situated parallel to the longitudinal sides of the trailer 12 and, in the transportation state (FIG. 3), are arranged flush between the sanitary modules 22, 26.

By contrast, in the operating state the sanitary modules 24, 28 are pulled out forward toward the user side, as illustrated in FIG. 1 for the sanitary module 24. This achieves better accessibility over the wheel house 40 of the trailer 12. In the plan view in FIG. 3, the wheel house 40 only for one of the two wheels of the trailer 12 is shown whereas the other wheel (referred to by reference number 42) is illustrated without the wheel house, for illustration purposes.

Each sanitary module 22, 24, 26, 28 therefore contains a plurality of sanitary elements (two in the sanitary module 28, three in the other sanitary modules). The sanitary elements are connected via a respective rear wall 44 to form the compact, single-piece sanitary module. The rear walls 44 are designed in such a manner that they enclose the central region 14 with the technical supply devices in an encircling manner both in the transportation state (FIG. 3) and in the operating state (FIG. 1). The technical supply devices are therefore removed from direct access by the user.

In the preferred exemplary embodiment, the sanitary modules 22 to 28 each are produced from a glass-fiber-reinforced plastic with an easy-care gel coat layer. The floor region of the sanitary modules 22 and 26 is covered by a high-grade steel plate. This achieves a robust and nevertheless lightweight construction.

Furthermore, in the embodiment shown, the sanitary system 10 has four (first) side flaps 48 which are arranged with the aid of hinges (not illustrated separately here) on the four outer sides of the trailer 12. In the illustrations of FIGS. 1 to 3, the four sides flaps 48 each are pivoted downward into a horizontal position. In this pivoting position, the four side flaps 48 form an encircling step region around the sanitary modules 22 to 28. Removable plug-in boards 50, to the freely accessible outer edge of which a stepladder (not illustrated here) can be fastened, are inserted at the four remaining corners. All in all, there is therefore the possibility of entering the sanitary system 10 from the four corners. For transportation, the plug-in boards 50 are removed and the side flaps 48 are subsequently pivoted vertically upward, so that they protect the sanitary modules 22 to 28 during transportation by forming a lateral outer wall.

FIG. 1 furthermore shows the basic design of a height-adjustable roof construction which is described in more detail below with reference to FIGS. 5 and 6. Four further side flaps 52 are arranged pivotably on the roof construction. In the horizontal pivoting position illustrated in FIG. 1, the side flaps 52 form a roof over the side flaps 48 correspondingly situated therebelow. When the need arises, a tent canvas can also be fastened between the deployed side flaps 52 and 48, so that the sanitary system 10 then provides complete weather protection for the users. Furthermore, in a preferred exemplary embodiment, there is an encircling railing (not illustrated here) which is fastened to the outer edge of the deployed side flaps 48.

For transportation of the sanitary system 10, first of all, the lateral tent canvas, if present, is removed, and the sanitary modules 24 and 28 are displaced into their transportation position illustrated in FIG. 3 and then the side flaps 48, 52 are folded in. It is provided here by the geometrical dimensions that the upper side flaps, when pivoted in, engage over the lower side flaps 48 at the upper edge thereof. As a result, the lower side flaps 48 are secured against unintentionally swinging open.

Figure 4:
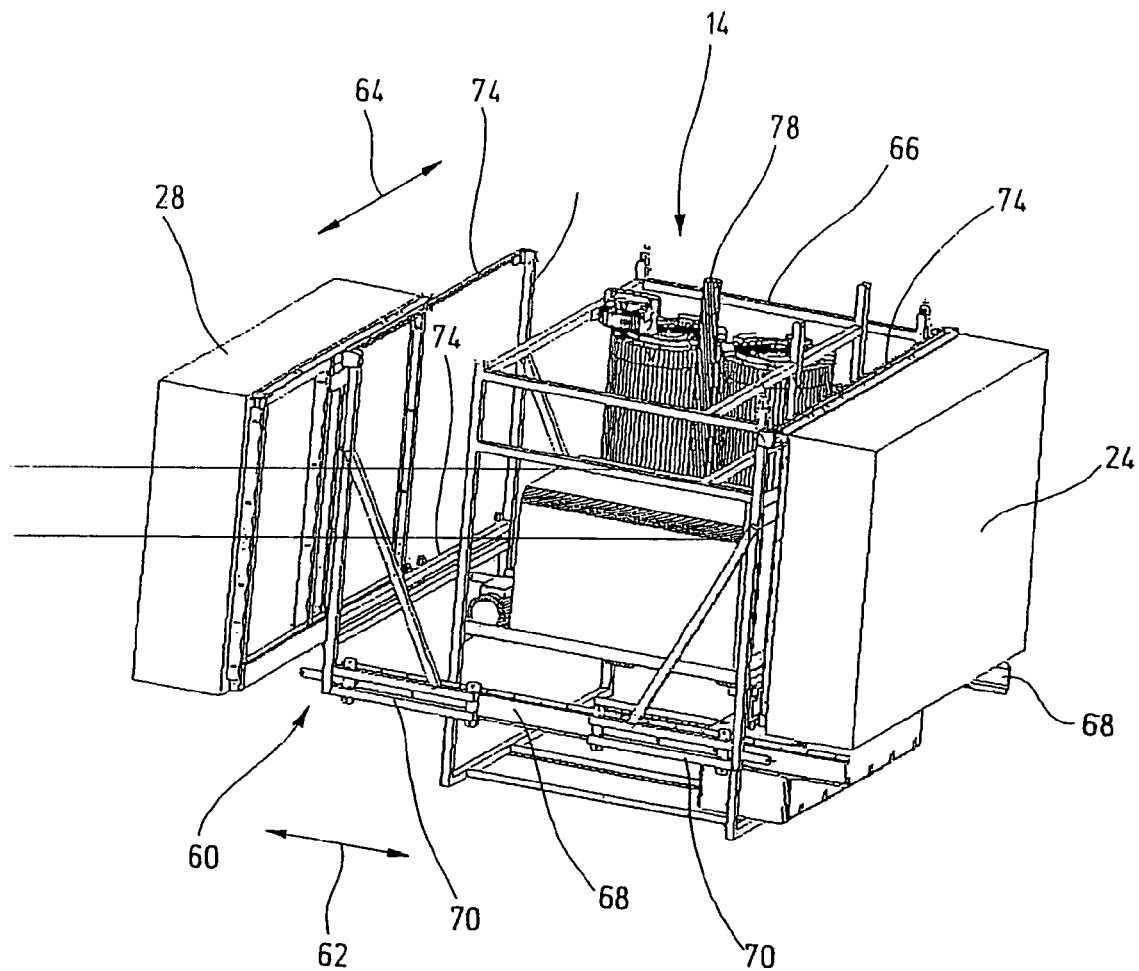
FIG. 4 shows the central region of the sanitary system from FIG. 1 with technical supply devices and with a displacement frame on which two sanitary modules are arranged displaceably.

FIG. 4 illustrates the central technical region 14 and a displacement frame 60 on which the two sanitary modules 24, 28 are displaceably arranged. For the sake of simplicity, the sanitary modules 24, 28 are only schematically illustrated here in the form of blocks. The displacement frame 60 permits each sanitary module 24, 28 to be displaced in two horizontal directions which are orthogonal to each other and are indicated in FIG. 4 by the arrows 62, 64. For this purpose, the displacement frame 60 has a framework 66 which surrounds the central technical region 14 and is fastened on the trailer 12 in a fixed manner. At its lower end, the framework 66 has two parallel, horizontal rails 68 which extend transversely between the two sanitary modules 24, 28. A total of four slides 70 are mounted on the rails 68. The slides 70 permit the sanitary modules 24, 28 to be displaced in the direction of the arrow 62, i.e., perpendicularly with respect to the user side of the sanitary modules 24, 28.

Two slides 70 in each case are connected to a framework part 72 engaging over the rails. The frame parts 72 can be displaced as a whole in the direction of the arrow 62. Two horizontal rails 74 are arranged on the framework parts 72 and span the intermediate space between the respectively paired slides 70. The sanitary module 24 or 28 is mounted in a transversely displaceable manner on the rails 74. Overall, the displacement frame 60 therefore permits the sanitary modules 24, 28 to be displaced in the two orthogonal horizontal directions. In particular, it is therefore possible to pull each sanitary module 24, 28 forward from the transportation position (FIG. 3) into the use position (FIG. 1). For maintenance purposes, each of the two sanitary modules 24, 28 can then be pulled even further forward and subsequently displaced to the side, as illustrated in FIG. 2.

FIG. 4 furthermore also shows an exhaust air chimney 78 which is arranged in the central technical region 14. In the preferred exemplary embodiment, the chimney 78 opens out in the manner described below on the roof of the sanitary system 10.

Figure 5:
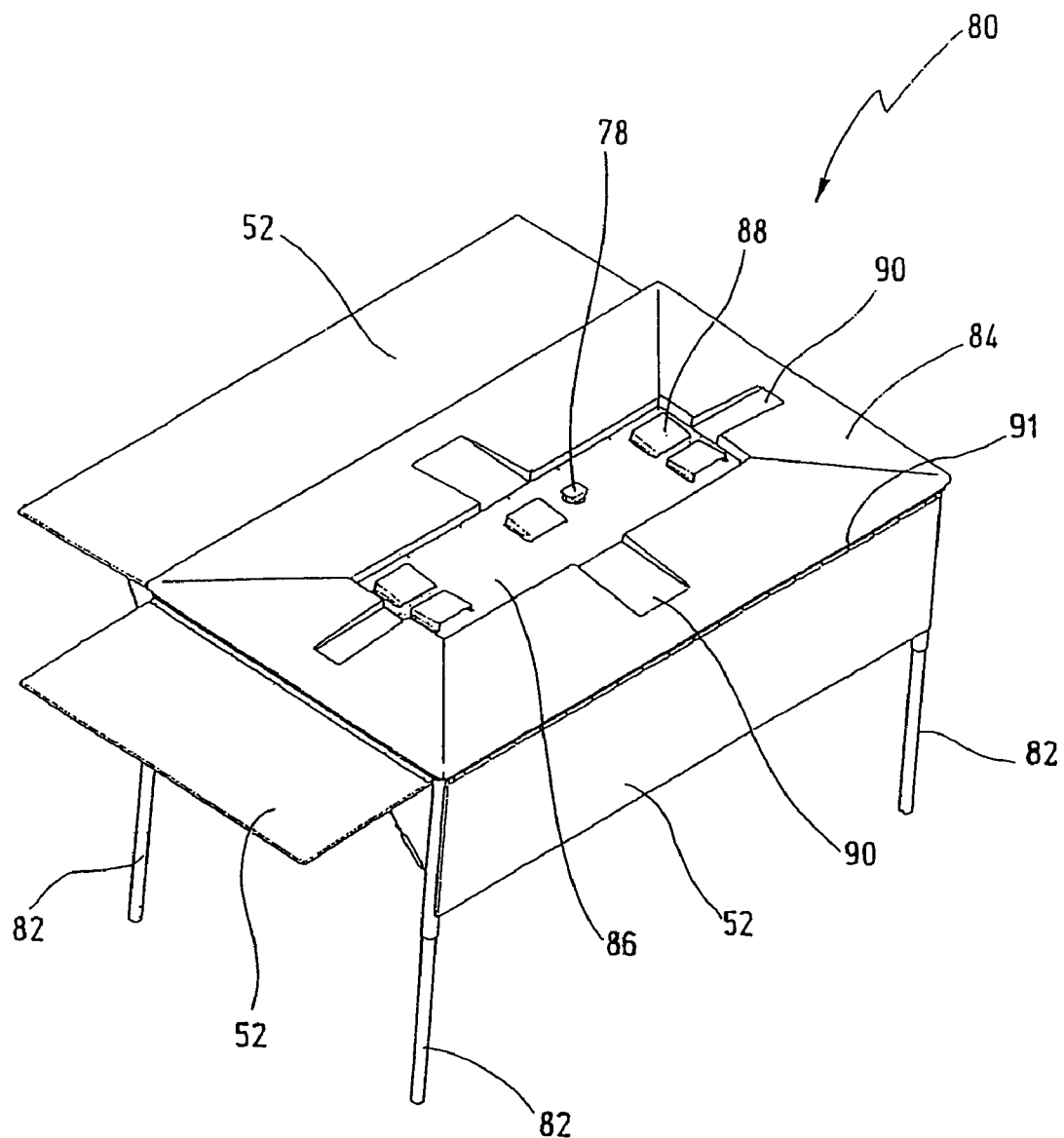
FIG. 5 shows an isometric illustration of a preferred roof construction for the sanitary system from FIG. 1.
Figure 6:
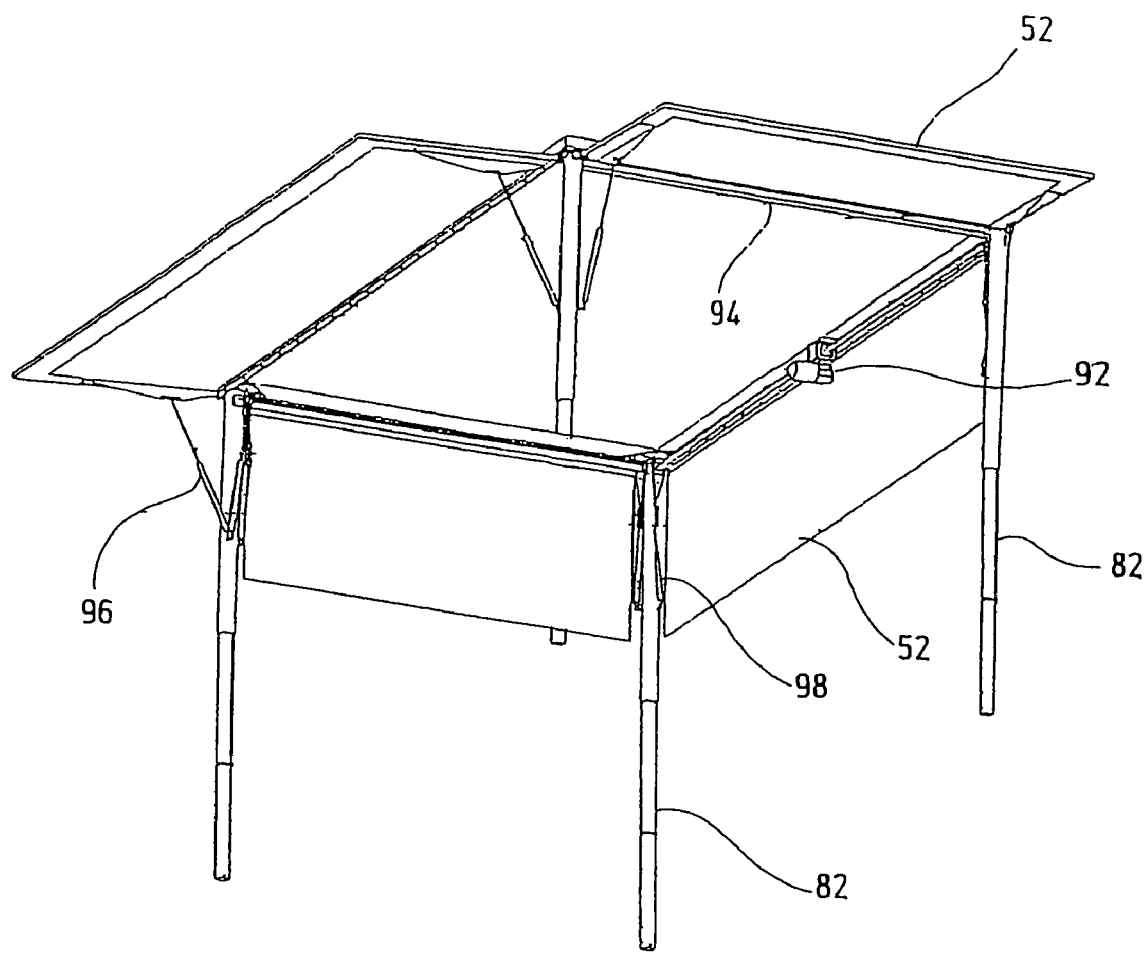
FIG. 6 shows the basic framework of the roof construction from FIG. 5 with further details.
Figure 4:
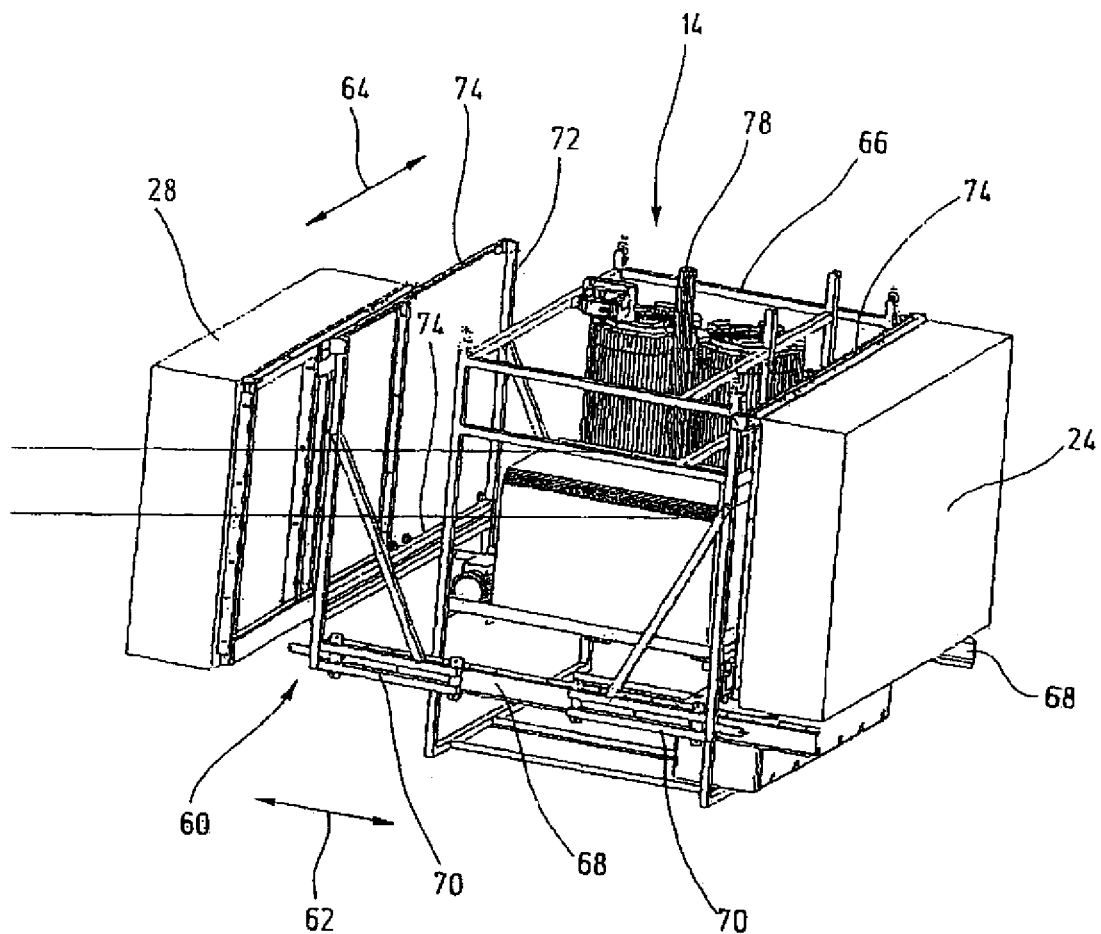

A preferred roof construction is illustrated schematically in FIGS. 5 and 6. The roof 80 has a rectangular area which corresponds to the area of the trailer 12. It is supported at its four corners on posts 82 which are changeable in length vertically in the manner of a telescopic rod. Each post 82 is hollow in the interior and a respective threaded rod (not illustrated) is arranged there, actuation of which moves the roof surface 84 upward or downward. In its central region, the roof surface 84 has a rectangular depression 86, the area of which lies below an upper roof level of the roof surface 84. The chimney 78 ends in the region of the depression 86. In addition, a plurality of ventilation scoops 88 are arranged in the region of the depression 86. Neither the chimney 78 nor the ventilation scoops 88 protrude upward over the upper roof level. A respective depression in the form of a channel 90 runs outward from the depression 86 to the four outer edges of the roof surface 84.

The roof surface 84 is produced from a GFRP (Glass Fiber Reinforced Polymer) material in a sandwich construction. The depression 86 and the side channels 90, independently of their previously explained function, achieve a profiling which ensures sufficient stability.

The four upper side flaps 52 are connected to the upper roof surface 84 in each case via continuous rubber hinges 91. The rubber hinges 91 ensure a waterproof seal between roof surface 84 and side flap 52.

FIG. 6 shows the roof 80 without the roof surface 84 in order to further explain adjustment mechanism. A drive for the height-adjustment of the roof 80 is referred to in FIG. 6 by the reference number 92. The drive 92 is arranged in the region of the roof 80. Four drive shafts 94, of which only one is illustrated in FIG. 6 for clarity reasons, are situated parallel to the four outer edges of the roof surface 84. The drive shafts 94 are driven by the drive 92 via deflection mechanisms. They are, for their part, connected via deflection mechanisms to the threaded rods (not illustrated) in the telescopic posts 82. By actuation of the drive 92, the roof 80 can therefore be adjusted in height.

The side flaps 52 are supported on the posts 82 in each case via gas-filled compression springs 96. In the swung-open state, the gas-filled compression springs 96 fix the side flaps 52 in their horizontal pivoting position. In this case, the gas-filled compression springs 96 are mounted rotatably in each case at their upper and lower base point and are geometrically arranged overall in such a manner that, when the side flap 52 is pivoted vertically downward, they pivot inward beyond the vertical position, as shown by way of indication with the gas-filled compression spring 98. By this means, the gas-filled compression spring 98 is also under pressure when the side flap 52 is closed, and it fixes the side flap 52 in its vertical (closed) pivoting position.

In the preferred embodiment, the sanitary system 10 has various sanitary elements. However, owing to the respectively identical dimensions, instead of the sanitary module 22 with the toilets, a sanitary module 26 with showers may also be installed, or vice versa. The sanitary modules 24 and 28 shown can be interchanged in each case in the same manner. Furthermore, it is generally possible to equip the sanitary modules 22 to 28 in a different way, depending on requirements.

As FIG. 1 illustrates, in the operating position the roof clearly extends beyond the height of the sanitary modules 22 to 28. In preferred exemplary embodiments, the remaining intermediate space between the upper end of the sanitary modules and the lower edge of the roof is closed visually by curtains or length-changeable slat constructions (not illustrated). The central technical region is therefore completely removed from the view of and access by the users.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A mobile sanitary system for location-independent sanitary care of a plurality of people, comprising a transportable platform having a central region and a plurality of outer sides, and comprising a plurality of sanitary modules including sanitary elements and a number of technical supply devices for the sanitary elements, wherein the sanitary modules and the technical supply devices both are arranged on the transportable platform, with the technical supply devices being arranged in the central region, and with each of the sanitary modules facing outward of the central region and toward an outer side of the transportable platform, wherein the sanitary modules surround the technical supply devices all the way around, wherein each sanitary module comprises at least one wall, wherein at least one of the sanitary modules is movably arranged between a first position and a second position such that in the first position, the at least one sanitary module is positioned adjacent to the central region and between two neighboring sanitary modules, and, in the second position, the at least one sanitary module is spaced apart from the central region and shifted laterally alongside of one of the two neighboring sanitary modules to define an access opening to provide maintenance access to the central region.

2. A mobile sanitary system for location-independent sanitary care of a plurality of people, comprising:
   a transportable platform having a central region and a plurality of outer sides,
   a plurality of sanitary elements and a number of technical supply devices for the sanitary elements, wherein the sanitary elements and the technical supply devices both are arranged on the transportable platform, with the technical supply devices being arranged in the central region, and with each of the sanitary elements facing outward of the central region and toward an outer side of the transportable platform and having at least a rear wall comprised of fiber-reinforced plastic wherein the sanitary elements are positioned to surround the technical supply devices all the way around with the respective rear wall of each sanitary element extending toward adjacent sanitary elements, wherein at least one of the sanitary elements is movably arranged between a first position and a second position such that in the first position, the at least one sanitary element is positioned adjacent the central region between two neighboring stationary sanitary elements, and, in the second position, the at least one sanitary element is spaced apart from the central region and shifted laterally alongside of one of the two neighboring stationary sanitary elements, a resulting space between the two neighboring stationary sanitary elements defining an access opening to provide maintenance access to the central region.

3. The mobile sanitary system of claim 2, wherein the plurality of rear walls enclose the technical supply devices in an encircling manner when the at least one movably arranged sanitary element is positioned in the first position.

4. The mobile sanitary system of claim 2, further comprising a frame supporting the at least one sanitary element movably arranged between a first position and a second position, wherein the frame is configured to support and guide of the at least one sanitary element as the at least one sanitary element is moved between the first position and the second position.

5. The mobile sanitary system of claim 4, wherein the frame is configured to permit displacement of the at least one sanitary element in at least one horizontal direction.

6. The mobile sanitary system of claim 4, wherein the frame is configured to permit a first displacement of the at least one sanitary element in a first direction, and a second, subsequent displacement in a direction substantially orthogonal to the first direction.

7. The mobile sanitary system of claim 2, wherein the sanitary elements are connected to form a plurality of sanitary modules, with one sanitary module being arranged at each outer side adjacent the central region.

8. The mobile sanitary system of claim 2, further comprising a height-adjustable roof and an adjustment drive for the roof.

9. The mobile sanitary system of claim 8, wherein the adjustment drive is arranged on the roof.

10. The mobile sanitary system of claim 2, comprising a plurality of first pivotable side flaps which, in a first pivoting position, at least partially cover the sanitary elements from the outside in the manner of a wall and which, in a second pivoting position, form an encircling step region around the sanitary elements.

11. The mobile sanitary system of claim 10, comprising a plurality of second pivotable side flaps which, in a first pivoting position, at least partially cover the sanitary elements from the outside in the manner of a wall and which, in a second pivoting position, form an encircling roof region over the sanitary elements.

12. The mobile sanitary system of claim 11, wherein the second pivotable side flaps engage over the first pivotable side flaps from above when the first and second side flaps each are in their first pivoting positions.

13. The mobile sanitary system of claim 11, comprising a plurality of spring elements connected to the second side flaps, wherein the spring elements and second side flaps are together configured to fix the second side flaps both in their first pivoting position and in their second pivoting position.

14. The mobile sanitary system of claim 2, wherein the sanitary elements comprise at least one shower, at least one toilet, and at least one washbasin.

15. The mobile sanitary system of claim 14, further comprising at least one pivotable mirror arranged in the region of the washbasin.

16. The mobile sanitary system of claim 15, wherein the mirror is a commercially available truck side mirror.

17. The mobile sanitary system of claim 2, wherein the transportable platform is a vehicle trailer.

18. The mobile sanitary system of claim 2, wherein the plurality of outer sides comprises four outer sides.

19. The mobile sanitary system of claim 2, wherein the at least one sanitary element is movable between the first position and a third transportation position, wherein the first position is disposed forward of the third transportation position, and a second position is disposed forward of the first position.

20. A mobile sanitary system for location-independent sanitary care of a plurality of people, comprising:
a transportable platform having a central region; and
a plurality of sanitary elements and a plurality of technical supply devices for the sanitary elements,
wherein the sanitary elements and the technical supply devices both are arranged on the transportable platform, with the technical supply devices being arranged in the central region, and with the sanitary elements surrounding the technical supply devices all the way around,
wherein each sanitary element has a rear wall, with the plurality of rear walls enclosing the technical supply devices in an encircling manner, and
wherein the technical supply devices comprise a switch cabinet with a control console which protrudes upward above the rear wall.

21. A mobile sanitary system for location-independent sanitary care of a plurality of people, comprising:
a transportable platform having a central region; and
a plurality of sanitary elements and a plurality of technical supply devices for the sanitary elements, and further comprising a height-adjustable roof and an adjustment drive for the roof,
wherein the sanitary elements and the technical supply devices both are arranged on the transportable platform, with the technical supply devices being arranged in the central region, and with the sanitary elements surrounding the technical supply devices all the way around,
wherein the roof, on its upper side, has an upper roof level and a central depression lying below the upper roof level, and the system has at least one chimney which is connected to the technical supply devices and which ends in the depression below the upper roof level.

22. The mobile sanitary system of claim 21, wherein the roof has a plurality of roof edges and wherein the depression runs into at least one channel laterally branching off to at least one of the roof edges.

* * * * *

UNITED STATES PATENT AND TRADEMARK OFFICE
CERTIFICATE OF CORRECTION

PATENT NO.       : 7,882,577 B2                                        Page 1 of 2
APPLICATION NO.  : 11/635923
DATED            : February 8, 2011
INVENTOR(S)      : Erwin Merz et al.

It is certified that error appears in the above-identified patent and that said Letters Patent is hereby corrected as shown below:

In the Drawings:
Delete Sheet 4, and replace with Sheet 4 of 6. (See Attached Sheet)

In the Specification:
Column 3, line 53, "a console" should read --a control console--.
Column 9, line 51, "explain adjustment" should read --explain the adjustment--.

Signed and Sealed this
Twenty-fifth Day of September, 2012

David J. Kappos
*Director of the United States Patent and Trademark Office*